Dec. 15, 1931.  L. M. WOOLSON  1,836,637
INTERNAL COMBUSTION ENGINE
Filed April 25, 1927   2 Sheets-Sheet 1
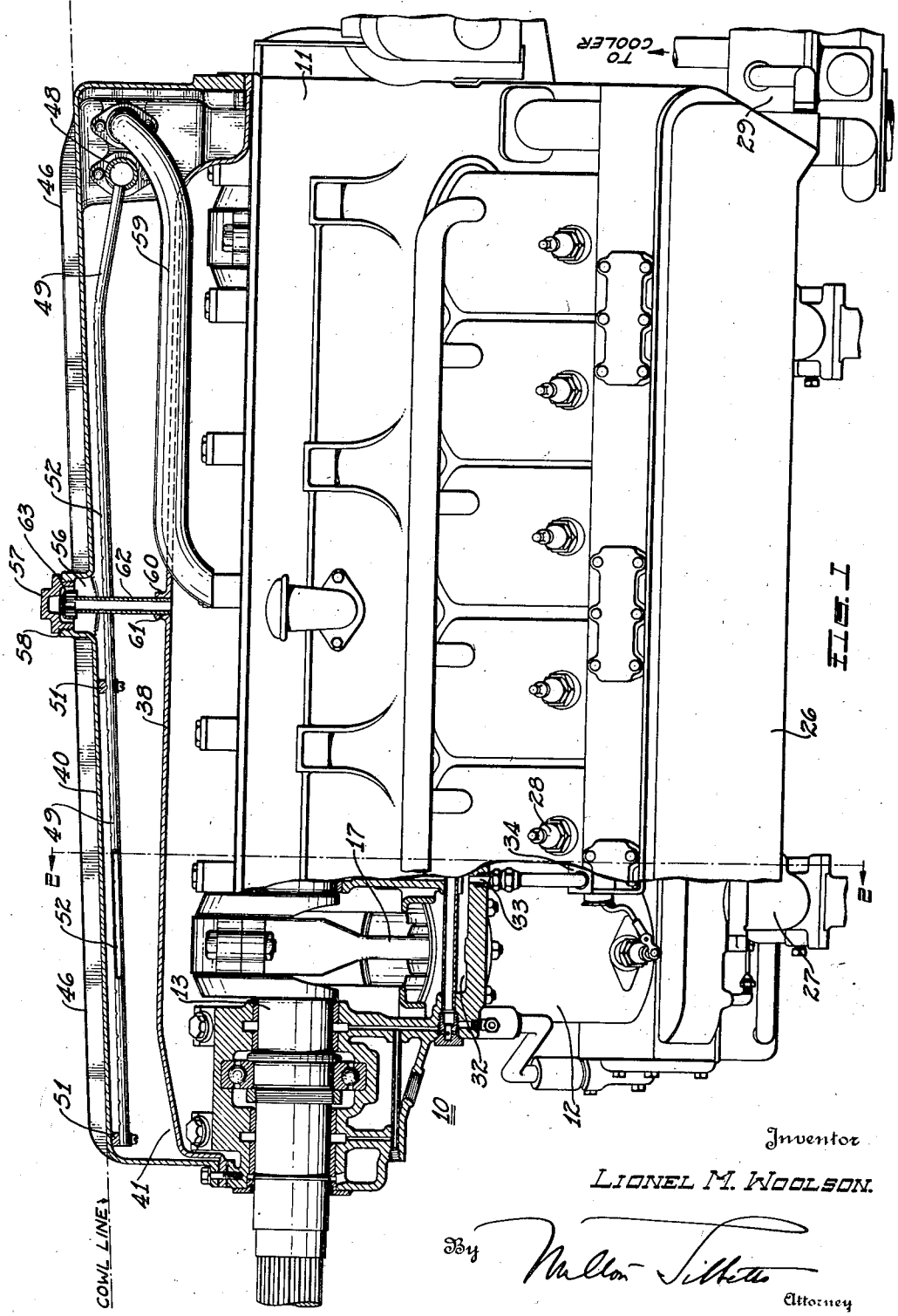
Inventor
LIONEL M. WOOLSON.
By
Attorney Dec. 15, 1931.  L. M. WOOLSON  1,836,637
INTERNAL COMBUSTION ENGINE
Filed April 25, 1927  2 Sheets-Sheet 2
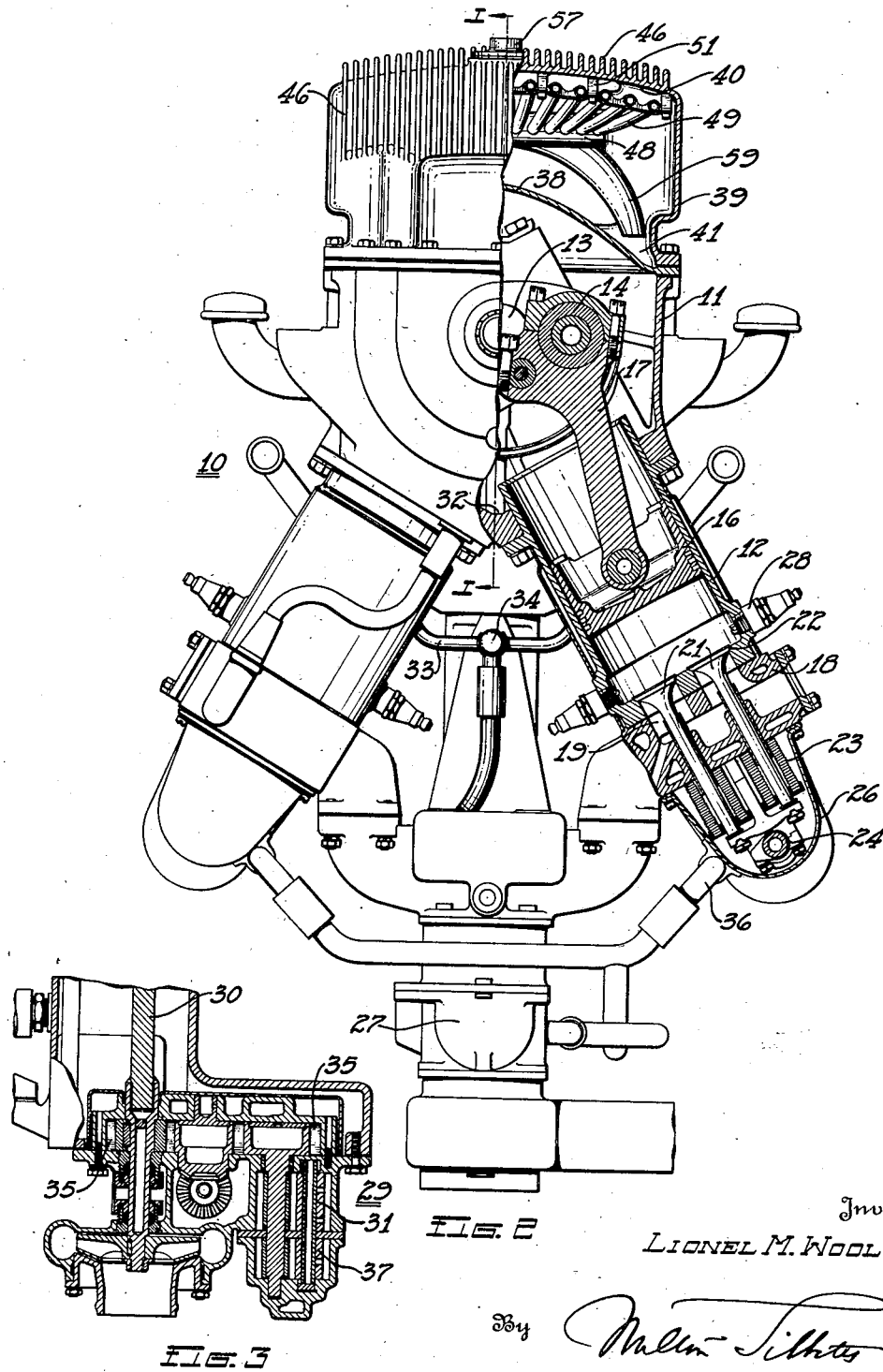
Inventor
LIONEL M. WOOLSON.
By
Attorney Patented Dec. 15, 1931

1,836,637

UNITED STATES PATENT OFFICE

LIONEL M. WOOLSON, OF DETROIT, MICHIGAN, ASSIGNOR TO PACKARD MOTOR CAR COMPANY, OF DETROIT, MICHIGAN, A CORPORATION OF MICHIGAN

INTERNAL COMBUSTION ENGINE

Application filed April 25, 1927. Serial No. 186,208.

This invention relates to internal combustion engines and to the lubrication systems of such engines, and more particularly it relates to the provision of cooling means for the lubricant used in engines.

In large engines which are operated for long periods under heavy loads and at high speeds, such as aircraft and marine engines, the lubricating oil circulated through the various engine bearings becomes hot, so that means for cooling this oil is desirable, and it has been previously proposed to place coolers or radiators in the circuit of the cooling system to reduce the temperature of the oil. Such coolers, however, have usually been bulky, heavy and inefficient devices, fragile in construction and easily disarranged, and frequently caused a material increase in head resistance of the vehicle on which they were mounted. Moreover, the cooled oil is quite viscous, and clings to the tubes or oil passages of the radiator, preventing the proper transfer of heat therethrough so that the efficiency of the device is impaired.

One of the objects of this invention is to provide simple and efficient oil cooling apparatus for engines, which shall be of relatively light weight and which shall occupy a minimum of space on the engine.

Another object of the invention is to provide oil cooling apparatus for engines of the automotive type which shall be a part of the engine structure and which shall not materially increase the head resistance of the vehicle on which it is mounted.

Another object of the invention is to provide oil cooling apparatus in which the cooled oil shall be continuously removed from the cooling surfaces by gravity.

Another object of the invention is to provide an oil cooling device for aircraft engines having cooling members arranged in the stream of air from the propeller of such engine, or caused by the motion of the vehicle.

Another object of the invention is to provide such an oil cooling device in which the resistance to flow of the oil is a minimum.

A further object of the invention is to provide an oil cooling device in which the cooling space shall form an oil reservoir for the lubricating system of the engine.

Other objects of the invention will appear from the following description taken in connection with the drawings, which form a part of this specification, and in which:

Fig. 1 is a side elevation of an internal combustion engine embodying the invention, partially broken away, and partially in section taken substantially on the line 1—1 of Fig. 2;

Fig. 2 is a view of the engine shown in Fig. 1, partially in end elevation, and partially in section taken substantially on the line 2—2 of Fig. 1, and Fig. 3 is a detail, sectional view of the pump assembly.

This invention is particularly well adapted for use with engines of the inverted type, in which the crankcase with its crankshaft is located above the cylinders and pistons, when the engine is in its normal position. It has been illustrated and described in connection with such an engine, but it is to be understood that the invention is not limited to engines of this type.

Referring to the drawings, at 10 is shown an internal combustion engine having a crankcase 11, below which are mounted inclined banks of cylinders 12 forming an inverted V, there being any desired number of cylinders in each of the banks. In the crankcase 11 is journaled a crankshaft 13 of the usual construction having the crank pins 14, each of which is associated with and operated from pistons 16 in the corresponding pair of cylinders 12. The pistons are connected to the crank pins 14 by connecting rods 17 of any suitable structure, such as the well known articulated rods. As this construction forms no part of the present invention and as it is well known, further description thereof is unnecessary.

Each bank of cylinders is provided with a cylinder head 18 in which are formed suitable ports 19 for the intake and exhaust of the engine, controlled by the valves 21. As shown, these valves are of the well known poppet type and are urged to their closed position on suitable valve seats 22, formed at the entrance of their respective ports, by the valve springs 23. They are adapted to be opened against the action of these springs by the usual cams, formed on cam shafts 24 journaled in each of the heads. Each of the cylinder heads 18 is also provided with a cover 26, forming an oil tight housing for the camshaft and valve operating gear.

The engine is provided with a suitable fuel feeding system including the usual carburetors 27, which are located below and between the banks of cylinders 12, but which are not shown in detail. The engine is also provided with the usual cooling system, including water jackets surrounding the cylinders and heads, and there is an ignition system of any convenient type, including spark plugs 28.

To provide proper lubrication of the various engine bearings, a pressure lubricating system is provided, wherein lubricating oil is circulated by means of suitable pumps, which may be arranged in a group or assembly 29 as clearly shown in Fig. 3, and driven in any convenient way from the engine, as by the shaft 30. In the embodiment illustrated this lubrication system is of the well known dry-sump type, in which oil is supplied to the bearings through suitable conduits (not shown), by means of a pressure pump 31. The oil thrown off from these bearings is drained into a sump 32 formed in the lower part of the crankcase between the cylinders therein, from which sump it is removed through drain conduits 33 and a manifold 34 by suitable scavenging pumps 35 and delivered to a storage reservoir conveniently located with respect to the engine. Oil from the valve housings 26 is also removed through separate drain conduits 36 and delivered to the reservoir by a pump 37, or the pumps 35 may be used for this purpose if desired. Oil from the reservoir is delivered to the suction side of the pressure pump 31, for redistribution to the engine bearings.

Such a system constitutes a closed circuit through which the oil is continually passed during the operation of the engine. The various pumps in the unit 29, which may include a pump for circulating cooling water and a fuel pump, are connected by proper suction and discharge conduits to their respective points of intake and discharge, but as the specific construction of these pumps and their connections forms no part of the present invention, and as such apparatus is well known in the art, more detailed description of them is unnecessary. In the present invention this lubricating system is also provided with an oil cooler, by means of which the hot oil removed from the sump by the scavenging pumps may be cooled before delivery to the reservoir.

This cooler is preferably mounted on the engine above the crankcase 11, the upper portion of which is closed by a cover 38 which may be of any convenient construction. In the present embodiment it is shown as a stamping or pan, dished upwardly and having marginal flanges adapted to be mounted on and removably secured to the crankcase walls. Above this cover 38 is mounted a housing having side walls 39 and a top wall or roof 40, which housing is adapted to cooperate with the cover 38 to form a reservoir 41 for the lubricating oil. The side walls are provided with marginal flanges adapted to contact the flanges of the cover 38, these flanges being removably secured together and to the crankcase 11 in any convenient way. Lubricating oil from the engine sump is delivered by the scavenging pumps 35 to the reservoir 41 through a suitable cooler hereinafter described, and the supply of oil for the engine is taken from this reservoir by the pressure pump 31.

The upper wall 40 of the reservoir 41 constitutes the principal cooling element and is adapted to readily absorb heat from the oil and to radiate it to the atmosphere. To this end its upper surface is provided with cooling ribs 46 extending longitudinally of the engine for substantially the entire length of the reservoir 41. These ribs occupy a position on the engine such that they project just above the cowl line of the airplane or other vehicle in which the engine is mounted, and are thus disposed in the strong air current or slip stream of the engine propeller (not shown), which is mounted in the usual way on the forward end of the crankshaft 13. In this way the upper wall 40 of the reservoir is very effectually cooled.

Near one end of the reservoir is mounted a cross tube or manifold 48, which is supported in any convenient manner a short distance below the upper wall 40. This manifold is connected by suitable piping (not shown) to the combined discharge of all the scavenging pumps 35, to receive oil removed by these pumps from the engine crankcase and from the valve housings.

Communicating with this manifold 48 are a number of tubes 49, which extend longitudinally of the reservoir 41 and are supported therein, as by means of hangers 51, a short distance below the wall 40. These tubes follow the general longitudinal contour of the wall 40 and are provided on their upper surfaces, with small, closely spaced orifices 52, which point upwardly toward the lower face of the wall 40. The open ends of the tubes 49 may be closed as by suitable plugs (not shown).

Oil delivered under pressure by the scavenging pumps to the manifold 48 is passed into the tubes 49, from which it squirts up in a number of small jets from the orifices 52. In this way the heated oil removed from the crankcase is forcibly sprayed or projected against the lower surface of the upper crankcase wall 40, the upper surface of which wall is cooled by the current of air passing along the cooling ribs 46. On striking this cooling surface the oil spreads out in a thin layer or film, in which condition it readily gives up heat to the wall 40 so that its temperature is reduced to a proper point for use in the engine. It then immediately drops by gravity into the reservoir, so that the lower surface of the wall 40 does not become coated with such an insulating layer of cold oil as to prevent the proper transfer of heat therethrough. The formation of such a viscous film of oil is further prevented by the scouring action of the spray of hot oil from the orifices 52, so that the cooling surface of the wall 40 is at all times clean and in excellent heat-exchanging condition.

The upper wall 40 of the reservoir is provided at any convenient place, as at the center of the engine, with a filler opening 56, through which oil may be added to the system. This opening is adapted to be closed by a cap 57 which may be screwed or otherwise removably secured in place, and if desired, suitable packing 58 may be provided for the filler cap 57 to prevent the leakage of oil therethrough when the engine assumes any unusual angle.

To permit a ready flow of oil from the reservoir 41 into the suction pipe 59 of the pressure pump, this reservoir is provided with a suitable vent, by means of which the pressure therein may be maintained substantially at atmosphere. For this purpose a boss 60 is provided in the crankcase cover 36, preferably directly below the filler opening 56, through which boss is provided an opening 61 in which a breather pipe 62 is secured. The upper end of the pipe 62 terminates at a point within the filler opening 56 just below the cap 57 thereof and may be provided with a splash shield or cap 63. In this way the atmospheric pressure obtaining in the crankcase is communicated to the reservoir 41, thus permitting the ready withdrawal of oil from the reservoir through the suction pipe 59. At the same time, by reason of the pipe 62 and its cap 63, all danger of flooding the crankcase with oil from the reservoir is prevented, even should the engine momentarily assume unusual positions.

It will be seen that this invention provides means for cooling the lubricating oil, which means is self-cleaning as regards the heat-exchanging surface, and which is therefore highly efficient at all times. Furthermore, there are no small pipes or passages in the cooling device through which the cooled oil must flow, nor are there any conduits between the cooling surfaces and the reservoir. Accordingly the resistance to flow is a minimum, and no additional complications are introduced into the lubricating system by reason of the inclusion of the cooler in the circuit thereof.

Moreover, as only the cooling ribs 46 project beyond the cowl line of the vehicle into the air stream, no appreciable amount of head resistance is added by reason of this cooling device.

While a specific embodiment of the invention has been herein described, which is deemed to be new and advantageous and may be specifically claimed, it is not to be understood that the invention is limited to the exact details of the construction, as it will be apparent that changes may be made therein without departing from the spirit or scope of the invention.

Having thus described the invention, what is claimed and desired to be secured by Letters Patent, is:

1. The combination with an internal combustion engine having a crankcase and a lubricating system, of a cover for said crankcase, a housing mounted on said cover to form therewith a reservoir for said lubricating system, means to cool the wall of said housing, and means to project heated lubricant from the engine against said wall to cool it before storage in the reservoir.

2. The combination with an internal combustion engine having a crankcase and an oil circulating system, of an oil reservoir on said engine, an oil manifold in said reservoir adapted to receive oil from the engine crankcase, and means connected to said manifold to project said oil against a wall of said reservoir to cool said oil.

3. The combination with an internal combustion engine having a crankcase and an oil circulating system, of an oil reservoir on said engine, and an oil cooler for said system comprising perforated tubes adapted to spray oil against the interior of the upper wall of said reservoir, and external cooling ribs integral with said wall.

4. The combination with an internal combustion engine having a crankcase and an oil circulating system, of an oil reservoir on said engine, an oil cooler in the reservoir comprising a manifold and associated tubes perforated to spray oil against a wall of said reservoir, means to dissipate heat from the outer surface of said wall, and pump means to supply oil to said manifold from the lower part of the crankcase.

5. The combination in a lubricating system for internal combustion engines including scavenging pumps for the engine crankcase and a pressure pump, of a reservoir for the lubricating oil forming part of the engine crankcase and adapted to receive oil from the scavenging pumps and to supply oil to the pressure pump, and a cooling device in said reservoir including means to finely divide the oil from the scavenging pumps and project it against a wall of said reservoir.

6. In an internal combustion engine having a lubrication system including a reservoir, a cooling element having a heat-exchanging surface comprising a wall of the reservoir, conduit means within the reservoir for distributing lubricant to the heat-exchanging surface, means including a pump driven from the engine to forcibly impel lubricant through said conduit distributing means, and means to collect cooled lubricant dropping from said surface.

In testimony whereof I affix my signature.

LIONEL M. WOOLSON.